US005773142A

United States Patent [19]

Murschall et al.

[11] Patent Number: 5,773,142
[45] Date of Patent: Jun. 30, 1998

[54] BIAXIALLY ORIENTED MULTILAYERED POLYOLEFIN FILM SEALABLE ON BOTH SIDES

[75] Inventors: Ursula Murschall, Nierstein; Herbert Peiffer, Mainz-Finthen; Gunter Schloegl, Kelkheim, all of Germany

[73] Assignee: Hoechst Aktiengesellschaft, Frankfurt am Main, Germany

[21] Appl. No.: 803,443

[22] Filed: Dec. 6, 1991

[30] Foreign Application Priority Data

Dec. 6, 1990 [DE] Germany ............................ 40 38 935.9

[51] Int. Cl.$^6$ ................................ B32B 7/12; B29D 3/00
[52] U.S. Cl. .................... 428/349; 428/516; 428/517; 428/519
[58] Field of Search .................. 428/349, 516, 428/347, 517, 519

[56] References Cited

U.S. PATENT DOCUMENTS

| | | | |
|---|---|---|---|
| 3,940,379 | 2/1976 | Castagna et al. | 260/88.2 |
| 4,147,827 | 4/1979 | Breidt, Jr. et al. | 428/349 X |
| 4,294,889 | 10/1981 | Hashimoto | 428/516 X |
| 4,297,415 | 10/1981 | Ward et al. | 428/349 |
| 4,345,005 | 8/1982 | All et al. | 428/461 |
| 4,348,457 | 9/1982 | Rosenthal et al. | 428/349 |
| 4,384,024 | 5/1983 | Mitchell et al. | 428/349 |
| 4,390,385 | 6/1983 | Ferguson et al. | 156/229 |
| 4,419,411 | 12/1983 | Park | 428/516 |
| 4,439,478 | 3/1984 | Ferguson et al. | 428/349 X |
| 4,439,493 | 3/1984 | Hein et al. | 428/516 X |
| 4,495,027 | 1/1985 | Wagner, Jr. et al. | 428/349 X |
| 4,692,380 | 9/1987 | Reid | 428/349 |
| 4,734,317 | 3/1988 | Bothe et al. | 428/215 |
| 4,740,421 | 4/1988 | Suzuki et al. | 428/349 |
| 5,017,430 | 5/1991 | Chu et al. | 428/353 |
| 5,089,319 | 2/1992 | Bothe | 428/349 X |

FOREIGN PATENT DOCUMENTS

| | | |
|---|---|---|
| 008904 | 3/1980 | European Pat. Off. . |
| 236945 | 9/1987 | European Pat. Off. . |
| 340579 | 11/1989 | European Pat. Off. . |
| 2201407 | 9/1988 | United Kingdom . |

OTHER PUBLICATIONS

C. Tzoganakis, et al., "Effect of Molecular Weight Distribution on the Rheological and Mechanical Properties of Polypropylene", Polymer Eng. and Science, vol. 29, No. 6, Mar. 1989, pp. 390–396.

*Primary Examiner*—Daniel Zirker
*Attorney, Agent, or Firm*—Foley & Lardner

[57] ABSTRACT

A transparent, coextruded mutilayered polyolefin film which can be sealed on both sides and having a base layer essentially comprised of a resin-modified propylene polymer and top layers essentially comprised of sealable olefin polymers. At 120° C., the multilayered film has a shrinkage in the longitudinal direction of more than 7% and a shrinkage in the transverse direction of more than 5%. The base layer of the film is essentially comprised of a peroxidically degraded propylene polymer, with the degradation factor A being in the range of 3 to 10, and it contains 5 to 25% of a hydrocarbon resin. The top layers of the multilayered film are essentially comprised of a random ethylene/propylene copolymer having an ethylene content of 2 to 8% by weight, a distribution factor $V_F$ of more than 8, and a thermooxidation temperature $T_{OX}$ of more than 230° C. The film exhibits a surface gloss (angle of measurement 20°) of more than 100 and a haze (measured on four superimposed film plies) of less than 22%.

11 Claims, No Drawings

BIAXIALLY ORIENTED MULTILAYERED POLYOLEFIN FILM SEALABLE ON BOTH SIDES

BACKGROUND OF THE INVENTION

The present invention is directed to a transparent, coextruded multilayered polyolefin film which can be sealed on both sides, the base layer being essentially comprised of a resin-modified propylene polymer and the top layers being essentially comprised of sealable olefin polymers.

Biaxially oriented multilayered polyolefin films which can be sealed on both sides and in which the base layer is comprised of propylene homopolymers and the two sealing layers (outer layers or top layers) are comprised of sealable olefin polymers are known form a number of publications, e.g., EP-A-0,194,588, EP-A-0,008,904, and U.S. Pat. No. 4,419,411. These multilayered polyolefin films possess a number of properties which are essential for packaging films, such as a wide sealing range, good heat-sealability, relatively high scratch resistance, low friction and hence good running properties on various types of high-speed packaging machines. However, the known films of this generic type do not yet satisfy all requirements in respect of their optical appearance.

In general, the above films are produced so that they possess high dimensional stability, i.e., their shrinkage both in the longitudinal and in the transverse direction is as low as possible. As a rule, packaging films of the above types possess a shrinkage of less than 4% in the longitudinal direction and of less than 2% in the transverse direction, determined at a temperature of 120° C. It was generally assumed that wrappings produced from films distinguished by these low shrinkage values also have a good optical appearance. Closer inspections have shown, however, that the wrappings do not fit tightly to the packaged goods, or that the edges are creased or wavy.

Furthermore, the water-vapor and oxygen barrier properties of the known films described above are within the customary range for polypropylene films, but they are not yet optimal.

SUMMARY OF THE INVENTION

It is an object of the instant invention to provide an improved biaxially oriented multilayered polyolefin film.

It is a particular object of the invention to provide such a film which is sealable on both sides, which combines excellent optical properties, i.e., low haze and high surface gloss, with improved barrier properties toward water vapor and oxygen, and good running properties on high-speed packaging machines, and which results in closely fitting, non-wavy, crease-free, brilliant wrappings.

A further object of the invention resides in the provision of a method for producing the multilayered film according to the invention.

Still another object of the invention is to provide an improved packaged product, in particular a wrapped soft cigarette package.

In accomplishing these objects, there has been provided according to one aspect of the invention a transparent, coextruded multilayered polyolefin film which can be sealed on both sides, comprising a base layer comprised of a resin-modified propylene polymer, and surface layers comprised of sealable olefin polymers, wherein a) at 120° C., the multilayered film has a shrinkage in the longitudinal direction of more than about 7%, and a shrinkage in the transverse direction of more than about 5%; b) the base layer of the multilayered film comprises a peroxidically degraded propylene polymer, having a degradation factor in the range of from about 3 to 10; c) the propylene polymer of the base layer comprises from about 5 to 25% by weight of a hydrocarbon resin; d) the surface layers of the multilayered film comprise a random ethylene/propylene copolymer having an ethylene content of from about 2 to 8% by weight, a distribution factor $V_F$ of more than about 8, and a thermooxidation temperature $T_{OX}$ of more than about 230° C.; e) the film has a surface gloss (measuring angle 20°) of more than about 100; and f) the film exhibits a haze (measured on four superimposed film plies) of less than about 22%.

In accordance with another aspect of the invention, there has been provided a method for producing a film of the type described above, which comprises the steps of: first producing a film by extrusion or coextrusion through a slot die; solidifying said film on a chill roller; and then orienting said film by stretching it in the longitudinal and transverse directions, wherein stretching in the longitudinal direction is performed at a temperature of less than about 120° C., at a stretch ratio greater than about 5:1.

According to still another aspect of the invention, there has been provided a packaged product, comprising an article to be packaged, which article is wrapped with a multilayer film as described above.

Further objects, features, and advantages of the present invention will become more apparent from the detailed description of preferred embodiments that follows.

DESCRIPTION OF THE PREFERRED EMBODIMENTS

The multilayered film according to the present invention is distinguished, in particular, by very special shrinkage properties, improved barrier properties toward water vapor and oxygen, and excellent optical properties.

The free surface of one or both sealing layers may be subjected to a corona treatment, whereby immediately following production the surface tension is more than about 36 mN/m, preferably between about 38 and 41 mN/m.

It was surprising that a film of the above type, i.e., which has an increased shrinkage of more than 7%, preferably of 8 to 15%, in the longitudinal direction, and an increased shrinkage of more than 5%, preferably of 6 to 12%, in the transverse direction, in each case determined at 120° C., results in a noticeably improved fitting of the film to goods to be wrapped. Due to the tight, crease-free and non-wavy wrapping, in combination with reduced haze and high surface gloss, the goods and packages wrapped in this film exhibit a substantially more attractive and brilliant appearance, which, in turn, improves the advertising effectiveness.

It was also surprising to find that the shrinkage values must be kept within narrow limits to achieve the desired effect.

If the shrinkage is less than 7% in the longitudinal direction and/or less than 5% in the transverse direction, in each case determined at 120° C., the packages wrapped in these films are wrapped loosely, and the formation of waves and creases is observed at the edges. If the shrinkage is more than 15% in the longitudinal direction and/or more than 12% in the transverse direction, in each case determined at 120° C., the film wrappings tend to cause deformation of the packages, in particular of non-rigid packages. In addition, higher shrinkage values lead to unattractive sealed seams due to the formation of shrink creases in the sealing area.

The values indicated for the shrinkage both in the longitudinal and transverse directions are in each case related to the dimensions of the film prior to the shrink process. The values were determined in accordance with DIN 40434 in a circulating air oven at a temperature of 120° C., with the high-temperature treatment being performed for 15 minutes.

The base layer of the film according to this invention is comprised of a peroxidically degraded propylene polymer which comprises a predominant proportion of propylene and has a melting point in the range of from about 162° to 168° C. A preferred propylene polymer is isotactic polypropylene containing a n-heptane-soluble fraction of 6% by weight or less. In order to achieve the desired good optical properties, the peroxidically degraded propylene homopolymer has a degradation factor A in the range of from about 3 to 10, preferably of from about 4 to 8. The melt flow index of the polypropylene starting powder preferably is less than about 1.5 g/10 min, in particular from about 0.2 to 0.9 g/10 min (determined according to DIN 53 735, under a load of 21.6N at 230° C). By the addition of organic peroxides, e.g., dialkyl peroxides, such as 2,5-dimethyl-2,5-di(t-butylperoxy) hexane or di-t-butyl peroxide, the polypropylene starting powder is degraded to a melt flow index of the granules in the range from about 2 to 5.5 g/10 min (determined according to DIN 53 735 under a load of 21.6N at 230° C.) during extrusion. The degradation factor A of the propylene homopolymer is defined as $$A = S_{G(PP)} \cdot S_{P(PP)}$$

with $S_{G(PP)}$ denoting the melt flow index of the degraded PP granules and $S_{P(PP)}$ denoting the melt flow index of the PP starting powder, the melt flow indices being determined as described above.

Peroxidic degradation and peroxidically degraded or CR (controlled rheology) polypropylenes per se are known, (see, e.g., PLASTVERARBEITER, 38th year, 1987, No. 4; POLYMER ENGINEERING AND SCIENCE, March 1989, Vol. 29, No. 6; and PLASTVERARBEITER, 36th year, 1985, No. 11). The peroxidically degraded propylene homopolymers described therein are used, in particular, in the fields of extrusion molding and fiber production. The publications do not mention the magnitude of the degradation factor of these products.

It was surprising that the degradation factor of the propylene homopolymer of the base layer must be kept within narrow limits. If it is less than 3, a deterioration of the optical properties is observed (considerable increase in haze, decreasing surface gloss). If it is higher than 10, problems arise during stretching, which has adverse effects on the machine running properties during film production. When the degradation factor exceeds 10, stretching of the propylene homopolymer is only possible within a very narrow temperature range or is even impossible.

Surprisingly, it has been found that the barrier properties of the film toward water vapor and oxygen can be essentially improved by incorporating a low-molecular weight resin having a softening point of more than 120° C. (determined in accordance with ASTM E-28) into the peroxidically degraded propylene homopolymer used for the base layer. This natural or synthetic resin is worked into the propylene homopolymer in a concentration of from about 5 to 25% by weight, relative to the total weight of the base layer, in order to improve the barrier properties of the film.

Among the numerous low molecular weight resins, hydrocarbon resins are preferred, in particular in the form of petroleum resins, styrene resins, cyclopentadiene resins and terpene resins. These resins are described in Ullmanns Enzyklopaedie der Techn. Chemie (Ullmann's Encyclopedia of Industrial Chemistry), 4th edition, volume 12, pages 525 to 555.

The petroleum resins are hydrocarbon resins which are prepared by polymerization of deep-decomposed petroleum materials in the presence of a catalyst. These petroleum materials usually contain a mixture of resin-forming substances such as styrene, methylstyrene, vinyltoluene, indene, methylindene, butadiene, isoprene, piperylene and pentylene. The styrene resins are low-molecular weight homopolymers of styrene or copolymers of styrene with other monomers, such as alpha-methyl-styrene, vinyltoluene and butadiene. The cyclopentadiene resins are cyclopentadiene homopolymers or cyclopentadiene copolymers which are obtained from coal-tar distillates and fractionated natural gas. These resins are prepared by keeping the cyclopentadiene-containing materials at a high temperature for a long period. Dimers, trimers or oligomers can be obtained, depending on the reaction temperature.

The terpene resins are polymers of terpenes, i.e. of hydrocarbons of the formula $C_{10}H_{16}$, which are present in almost all ethereal oils or oil-containing resins in plants, and phenol-modified terpene resins. Alphapinene, beta-pinene, dipentene, limonene, myrcene, camphene and similar terpenes may be mentioned as specific examples of the terpenes.

The hydrocarbon resins can also be so-called modified hydrocarbon resins. In general, modification is effected by reaction of the raw materials before polymerization, by introduction of special monomers or by reaction of the polymerized product, with hydrogenations or partial hydrogenations, in particular, being performed.

Other hydrocarbon resins employed are styrene homopolymers, styrene copolymers, cyclopentadiene homopolymers, cyclopentadiene copolymers and/or terpene polymers having, in each case, a softening point of more than 120° C. (in the case of the unsaturated polymers, the hydrogenated product is preferred). With particular preference, the cyclopentadiene polymers having a softening point of more than 120° C. are used in the base layer.

If the sealable top layers contain a resin as well, the same resins as mentioned above for the base layer can be employed.

The sealable top layers are essentially comprised of a random ethylene/propylene copolymer having an ethylene content of 2 to 8% by weight, preferably of 3 to 7% by weight, a distribution factor $V_F$ of more than 8 and a thermooxidation temperature $T_{OX}$ of more than 230° C.

The ethylene content and the distribution factor of the copolymer are determined by means of $^{13}C$ NMR spectroscopy. Measurements were carried out using HX-270 Nuclear Magnetic Resonance Spectrometer from Messrs. BRUKER, Germany, fitted with a BRUKER Aspect 2000 computer.

To perform the measurement, the ethylene/propylene copolymer to be characterized was dissolved in a solvent mixture comprising 65% by volume of hexachlorobenzene and 35% by volume of 1,1-dideuterotetrachloroethane, such that a 10% strength solution resulted. Octamethyltetrasiloxane (OMTS) was added as the reference standard. The 67.9 MHz $^{13}C$ nuclear resonance spectrum was measured at 130° C. The spectra were evaluated in accordance with the method described in J. C. Randall, Polymer Sequence Distribution (Academic Press, New York, 1977).

The distribution factor is defined as $$V_F = C_i : (C_G - C_i)$$

with $C_G$ denoting the total content of ethylene in the copolymer, in % by weight, and $C_i$ denoting the content of ethylene, in % by weight, which is present as isolated ethylene fraction, i.e., a single, isolated ethylene block is present between two propylene blocks in the way diagrammatically shown below:

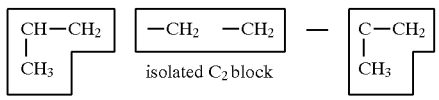

The idealized thermooxidation temperature $T_{OX}$ is determined as follows:

In a differential calorimeter, 2 to 5 mg of the raw material to be measured are heated at a rate of 20 K/min. Air is used as flushing gas, the starting temperature is 295K. The measurement demonstrates the change of the heat flow as a function of increasing temperatures. After the melting of the raw material, the values are first such that the curve runs substantially horizontally (base line), but starting from a specific temperature these values are increased as a result of oxidation (exothermic branch).

The idealized thermooxidation temperature is defined as the point of intersection between the straight elongation line of the exothermic branch of the thermogram and the base line.

It was surprising to see that the above described parameters for the propylene/ethylene copolymer used for the polyolefinic top layers of the film according to the present invention must be kept within very narrow limits in order to obtain in an optimal way all the properties which constitute the object of this invention. The ethylene content and the distribution factor $V_F$ of the copolymer are of importance in view of surface treatment by means of corona discharge, of long-term printability and of the optical properties of the film. If the ethylene content is less than 2% by weight, corona treatment is difficult and the long-term effect of the treatment is unfavorable. If the ethylene content is increased to more than 7% by weight or the distribution factor is less than 8, the optical properties, in particular the surface gloss, are impaired.

The thermooxidation temperature is particularly important for ink adhesion. If the thermooxidation temperature of the printable top layer is less than 230° C., the formation of degradation products on the film surface as a result of corona treatment is so strong that the ink adhesion is reduced.

In accordance with this invention, the top layers may furthermore contain at least one anti-blocking agent. Examples of suitable anti-blocking agents include inorganic additives, such as silicon dioxide, calcium carbonate, magnesium silicate and/or organic anti-blocking agents such as polyamide, polyester and, in particular, benzoguanamine/formaldehyde copolymers and the like. It is essential for the anti-blocking agent that the mean particle size is between about 1 and 6 µm, preferably between about 2 and 5 µm. Silicon dioxide and calcium carbonate are preferably employed as anti-blocking agents.

Particular preference is given to globular anti-blocking agents. Suitable globular inorganic materials and their addition to films made of thermoplastic plastics materials are described, for example, in EP-A-0,236,945 and in DE-A-38 01 535. The added amount of anti-blocking agent is from about 0.1 to 2% by weight, preferably from about 0.1 to 0.5% by weight, relative to the total weight of the top layer.

The thickness of the sealing layer is greater than about 0.4 µm, preferably between about 0.4 and 1.0 µm. If the layer thickness is less than about 0.4 µm, the sealing properties are seriously affected (increased sealing kick-off temperature, reduced strength of sealed seam). If the layer thickness exceeds about 1.0 µm, the optical appearance of the film and the processing properties are impaired.

In order to further improve certain properties of the polyolefin film according to this invention, the base layer and the two sealing layers may contain effective amounts of other appropriate additives, preferably antistatic agents, lubricants, stabilizers and neutralizing agents.

Preferred antistatic agents include alkali alkane sulfonates, polyether-modified, i.e., ethoxylated and/or propoxylated polydiorganosiloxanes, such as polydialkylsiloxanes, polyalkylphenylsiloxanes and the like, and/or the essentially straight-chain and saturated aliphatic tertiary amines having a $C_{10}$ to $C_{20}$ aliphatic radical, which carry 2-hydroxyalkyl-($C_1$ to $C_4$) substituents, with N,N-bis-(2-hydroxyethyl)-alkyl-amines possessing $C_{10}$ to $C_{20}$ alkyl groups and preferably $C_{12}$ to $C_{18}$ alkyl groups being particularly suitable. The effective amount of antistatic agent is in the range of from about 0.05 to 0.3% by weight, relative to the weight of the layer.

Examples of suitable lubricants include higher aliphatic acid amides, higher aliphatic acid esters, waxes and metal soaps and also polydimethylsiloxane. The effective amount of lubricant is in the range from about 0.1 to 3% by weight, relative to the weight of the layer. The addition of from about 0.15 to 0.25% by weight of higher aliphatic acid amides, e.g., erucic acid amide, to the base layer and/or top layers has proved to be particularly advantageous. Very good results are achieved by the addition of polydimethylsiloxane to one or both top layers. The added amount here is expediently in the range from about 0.3 to 2.0% by weight, and the viscosity of the polydimethylsiloxane is between about 10,000 and 1,000,000 $mm^2/s$.

A phenolic stabilizer having a molecular weight of more than about 500 g/mol is preferably contained in the base layer and in the top layers. Suitable stabilizers include, in particular, pentaerythrityl-tetrakis-3-(3,5-di-tert.butyl-4-hydroxyphenyl)propionate and 1,3,5-trimethyl-2,4,6-tris-(3,5-di-tert.butyl-4-hydroxybenzyl) benzene. The added amount is from about 0.1 to 0.6% by weight, preferably from about 0.15 to 0.3% by weight. Calcium stearate and/or calcium carbonate having an average particle size of not more than 0.05 µm, an absolute particle size of less than about 5 µm and a specific surface of at least about 80 $mm^2/g$ is employed for neutralizing the residual amounts of catalysts contained in the materials used for the base layer and the top layers. The added amount is from about 0.01 to 0.05% by weight.

The ethylene/propylene copolymer employed for the top layers has a lower melting point than the peroxidically degraded propylene polymer employed for the base layer. The melting point of the raw material of the top layers in general is in the range of from about 80° to 150° C.

The melt flow index of the copolymer employed for the sealing layer is higher than that of the propylene homopolymer employed for the base layer. Generally, the melt flow index of the ethylene/propylene copolymer is in the range of from about 5 to 12 g/10 min, determined at 230° C. and under a load of 21.6N (DIN 53 735).

The total thickness of the multilayered film according to the present invention can be varied within wide limits and depends, in particular, on the intended use. As a rule, it is between about 10 to 60 µm, whereby the sealing layers in each case have a thickness of more than about 0.4 µm, preferably of from about 0.5 to 1.0 µm. The thickness of the base layer amounts to about 50 to 90% of the total film thickness.

The multilayered film of this invention is distinguished, in particular, by its improved barrier properties toward water vapor and oxygen, its excellent optical properties and the increased shrinkage values in the longitudinal and transverse directions described above. Its surface gloss (angle of measurement 20°) is higher than about 100, preferably from about 105 to 130 (determined according to DIN 67530) and the haze of the film (measured on 4 superimposed film plies, employing the method of ASTM-D-1003-52) is less than about 22%, preferably from about 10 to 18%.

The described high shrinkage values are surprisingly obtained by changing the usual process conditions during the film production as follows:

reduced stretching temperature
increased stretching ratio in the longitudinal direction
reduced stretching ratio in the transverse direction
increased film convergence during heat-setting In accomplishing the objects of the invention described at the outset, there has also been provided a process for producing the film disclosed herein. The process of this invention comprises the steps of producing a cast film by extrusion or coextrusion through a slot die, solidifying said cast film on a chill roll and subsequently orienting said film by stretching it in the longitudinal and transverse directions. In accordance with this invention, the conditions for the longitudinal stretching are selected such that the longitudinally stretched film is highly oriented. This is a good prerequisite for achieving a high shrinkage in the longitudinal direction. Longitudinal stretching is performed at a temperature of less than about 120° C., preferably between about 95 and 115° C., and the stretch ratio is greater than about 5:1, preferably it is in the range of from about 5.5:1 to 8:1.

The temperatures set for stretching in the traverse direction favorably are higher than about 140° C., preferably they are in the range of from about 145° to 160° C. The transverse stretch ratio should not exceed a value of about 10:1. Preference is given to a stretch ratio in the range of from about 9:1 to 6:1. The duration of the transverse stretching should be less than about 10 seconds. Otherwise the shrinkage in the longitudinal direction, which was induced by the longitudinal stretching, might relax.

Stretching in the transverse direction is followed by a final heat-setting treatment. For this purpose the film is conveyed in the tenter frame in a converging manner, at a temperature which is 20° to 40° C. below the temperature for the transverse stretching, in particular at a temperature of less than about 130° C., most preferably of less than about 120° C. The convergence during heat-setting preferably is from about 15–20%.

Good printing, metallizing and bonding behavior of the film is achieved by carrying out any one of the customary surface treatments prior to the winding up of the film, such as an electric corona discharge treatment and/or a flame treatment. The treatment intensities are within the customary range, intensities of between about 38 and 41 mN/m being preferred.

The multilayered shrink film according to this invention possesses a combination of properties which make them particularly well suited for use as packaging film or wrapping film on high-speed wrapping machines. On the one hand, it possesses all the properties demanded of polyolefin films in view of obtaining a tight, crease-free, non-wavy, brilliant, attractive wrapping. On the other hand, the packaged goods or foodstuffs remain fresh and attractive over a long period due to the improved barrier properties of the film toward water vapor and oxygen.

The film is in particular distinguished by:
improved barrier properties toward water vapor and oxygen;
a high shrinkage in the longitudinal direction of more than about 7%, preferably of from about 8 to 15%, measured at 120° C.;
a high shrinkage in the transverse direction of more than about 5%, preferably of from about 6 to 12%, measured at 120° C.;
low haze and homogeneous appearance;
high surface gloss on both sides;
sealability on both sides;
high scratch resistance of both top layers;
suitability for surface treatment;
good immediate and long-term printability and coatability;
good behavior during further processing.

If the flame or corona treatment is omitted, the multi-layered polyolefin film according to this invention is particularly well suited as a wrapping film for cigarette packs, because apart from the properties required in view of processability on high-speed packaging machines, it is distinguished by extremely low haze and high gloss. Moreover, very tightly and crease-free wrapped cigarette packs can be produced, which have a brilliant and very attractive appearance. Due to the low permeability to water vapor and oxygen of the film according to the invention, the aging and drying out of cigarettes wrapped therein is slowed down considerably.

By way of the exemplary embodiments described below, the invention will be explained in even greater detail.

EXAMPLE 1

A three-layered film having a total thickness of 1 mm is produced by coextrusion through a slot die at an extrusion temperature of 260° C. The main component of the base layer of the film is constituted by a peroxidically degraded (isotactic) propylene homopolymer having an n-heptane-soluble fraction of 4.5% by weight and melting point of 165° C.

By the addition of di-t-butyl peroxide, the propylene polymer is degraded from a polypropylene starting powder having a melt flow index $S_{P(PP)}$ of 0.7 g/10 min, to a granule melt flow index $S_{G(PP)}$ of 3.5 g/10 min (in each case determined according to DIN 53735 under a load of 21.6N and at a temperature of 230° C.), so that a degradation factor A of 5 results.

The propylene polymer of the base layer contains an addition of 10% by weight of a resin having a softening temperature of 140° C. (®Escorez ECR 356, from Exxon, Darien, Conn., USA).

The base layer is sandwiched between two sealing layers (outer layers or top layers), i.e., the three-layered film has an A-B-A structure (A denoting the sealing layers, B denoting the base layer).

Each layer contains 0.12% by weight of pentaerythrityl-tetrakis-3-(3,5-di-tert.-butyl-4-hydroxyphenyl)propionate (®Irganox 1010) as stabilizer and 0.06% by weight of calcium stearate for neutralizing acidic catalyst residues. The base layer furthermore contains 0.15% by weight of N,N-bis-(2-hydroxyethyl)-($C_{10}$–$C_{20}$)alkylamine (®Armostat 300) as an antistatic agent.

The polyolefinic sealing layers are comprised of a random ethylene/propylene copolymer with an ethylene content of 4.5% by weight and a propylene content of 95.5% by weight. The copolymer is provided with 0.33% by weight of silicon dioxide having an average particle size of 2.0 μm and an aspect ratio of 1, and with 0.8% by weight of polydimethylsiloxane having a kinematic viscosity of 30,000 mm²/s at 25° C. The ethylene/propylene copolymer has the following characteristics:

Distribution factor $V_F$: 17
Idealized thermooxidation temperature: 256° C.
Melt flow index (DIN 53 735): 6.0 g/10 min
Melt point: 135° C.

The production of the biaxially oriented film involves the process steps of coextrusion, chilling, longitudinal stretching, transverse stretching, and heat-setting. The biaxially oriented film has a total thickness of 20 μm, and each of the sealing layers has a thickness of 0.8 μm.

The process conditions for the individual steps are:
Extrusion
  Extrusion temperature=260° C.
  Temperature (T) of chill roller=60° C.
Longitudinal stretching
  T stretch roller=107° C.
  T chill roller=90° C.
  Stretch ratio $S_1$=6.5
Transverse stretching
  T heating-up areas=163° C.
  T stretching areas=148° C.
  Stretch ratio $S_t$=8
Heat-setting
  T=120° C.
  Duration (t)=2 seconds
  Convergence =18%

The properties of the film obtained in this way are compiled in the attached Table.

EXAMPLE 2

The procedure followed and the process conditions for the individual steps are the same as in Example 1.

By the addition of di-t-butyl peroxide, the (isotactic) propylene homopolymer of the base layer is degraded from a polypropylene starting powder having a melt flow index $S_{P(PP)}$ of 0.5 g/10 min to a granule melt index $S_{G(PP)}$ of 3.5 g/10 min (in each case determined according to DIN 53 735, under a load of 21.6N and at 230° C.), so that a degradation factor A of 7 results.

The three-layered film produced in this Example has an A-B-C structure where A and C denote the sealing layers and B denotes the base layer. The ethylene/propylene copolymer of layer A contains 1.6% by weight of polydimethyl siloxane having a kinematic viscosity of 500,000 mm²/S, determined at 25° C., and 0.3% by weight of silicon dioxide having a mean particle size of 4 μm. The random copolymer employed for layer C contains 0.33% by weight of silicon dioxide having a mean particle size of 2 μm and does not contain a polydimethyl siloxane admixture. Layer C is subjected to a corona treatment, such that the surface tension of the layer immediately after the treatment is 40 mN/m.

EXAMPLE 3

The procedure followed and the process conditions are the same as in Example 1.

The polypropylene of the base layer contains 15% by weight of a resin having a softening point of 140° C. (®Escorez ECR 356, from Exxon, Darien, Conn., USA).

Comparative Example 1

A three-layered film is produced in accordance with Example 1. The isotactic propylene homopolymer likewise has a granule melt index of 3.5 g/10 min, determined according to DIN 53 735, under a load of 21.6N and at 230° C. However, the propylene polymer of the base layer was not peroxidically degraded, and it does not contain a resin.

The process conditions in the individual steps are:
Extrusion
  extrusion T=260° C.
  chill roller T=60° C.
Longitudinal stretching
  stretching roller T=120° C.
  chill roller T=100° C.
  stretch ratio $S_L$=5
Transverse stretching
  heating areas T=175° C.
  stretching areas T=162° C.
  Stretch ratio $S_Q$=10
Heat-setting
  T=130° C.
  duration=5 seconds
  convergence=10%

Comparative Example 2

A three-layered A-B-C film is produced in accordance with Example 1 of EP-A-0,194,588 (=U.S. Pat. No. 4,734,317).

Comparative Example 3

A three-layered film is produced in accordance with Example 4 of U.S. Pat. No. 4,419,411.

To characterize the individual raw materials and films, the following methods were employed in addition to the methods already described hereinabove:
Melt Flow Index
  DIN 53 735, under a load of 21.6N and at 230° C.
Melting Point
  DCS measurement, maximum of melting curve, heating rate 20° C./min.
Haze
  The haze of the film is measured according to ASTM-D-1003-52, except that a 1° slit diaphragm is used instead of a 4° pinhole diaphragm, and the haze is indicated for four superimposed film plies, because in this way the optimum measurement range is used. The haze values obtained are evaluated as follows:

≤17%=very good (++)
>17% to 20%=good (+)
>20% to 25%=still satisfactory (±)
>25%=unsatisfactory (−)

Gloss
  The gloss is determined in accordance with DIN 67 530. The reflector value is measured as an optical characteristic value for the surface of a film. Similar to the standards ASTM-D-523-78 and ISO 2813, an angle of 20° was selected for the incident radiation. A light beam hits the planar test surface at the preset angle of incidence and is reflected or scattered. The light beams which hit the photoelectronic receiver are displayed as a proportional electrical magnitude. The measured value is dimensionless and therefore must always be stated together with the angle of incidence. The gloss is evaluated as follows (angle of light incidence 20°):

>115=very good (++)
≦115 to 110=good (+)
<110 to 100=still satisfactory (±)
<100=unsatisfactory Scratch Resistance or Sensitivity to Scratching The scratch resistance is measured in a way similar to that described in DIN 53 754.

Measurement is performed using an abrasion tester Taber 503 Abraser from Messrs. Teledyne Taber, which is equipped with Calibrade R H 18 abrasion wheels loaded with 250 g. The scratch resistance or sensitivity to scratching is defined as the increase in haze of the film after 50 revolutions of the plate with the sample to be tested, compared to the original film. The scratch resistance is evaluated as follows:

Haze increase less than 22%=very good (++)
Haze increase 22 to 25%=good (+)
Haze increase 25 to 30%=still satisfactory (±)
Haze increase over 30% =unsatisfactory (−)

Strength of Sealed Seam

Two film strips (each 15 mm wide) are placed on top of one another and sealed at a temperature of 130° C. and a pressure of 1.5 N/cm² for 0.5 seconds, using a Brugger NDS apparatus with a single-sided sealing jaw heating. The strength of the sealed seam is determined by means of the T-peel method.

Sealing Kick-off Temperature

Using a Brugger HSG/ET sealing apparatus, heat-sealed film samples (sealed seam 20 mm×100 mm) are produced by sealing a film at various temperatures at a sealing pressure of 1.5 N/cm² for 0.5 seconds, by means of two heated sealing jaws. Test strips which are each 15 mm wide are cut from the sealed samples. The T-sealing strength, i.e., the force required to separate the sealed strips, is determined by means of a tensile tester adjusted to a draw-off speed of 200 mm/min, with the sealed seam being aligned perpendicularly to the direction of the tensile force. The sealing kick-off temperature, i.e., the minimal sealing temperature is the temperature at which the sealed seam has a strength of at least 0.5 N/15 mm.

Intensity of Corona Treatment

The corona treatment is performed such that, immediately following the treatment, the treated film surface has a treatment intensity of 39 to 40 mN/m, determined according to the so-called ink method (DIN 53 364).

Long-Term Intensity

Measurement of the corona treatment intensity is repeated every two weeks. It is evaluated as being very good if after 4 months it still is at least 37 mN/m (B 2 mN/m). It is evaluated as being unsatisfactory if it is less than 35 mN/m (B 4 mN/m).

Shrinkage

The shrinkage values in the longitudinal and transverse directions are in each case related to the length of the film prior to shrinking. The shrinkage values are determined in a circulating air oven at a temperature of 120° C. during 15 minutes in accordance with DIN 40 434.

Machine Running Properties

The running properties of the films on wrapping machines are assessed visually and rated as follows:

very good (++): less than 2% of the test packs are wrapped unsatisfactorily
good (+): 2 to 6% of the test packs are wrapped unsatisfactorily
satisfactory (±): 6 to 12% of the test packs are wrapped unsatisfactorily
unsatisfactory (−): more than 12% of the test packs are wrapped unsatisfactorily Appearance of Wrapping The appearance of the wrappings is assessed visually (see Table below).

Permeability to Water Vapor and oxygen

The permeability of the films to water vapor is measured in accordance with DIN 53 122, part 2. The barrier action toward oxygen is determined in accordance with DIN 53 380, part 3, at a relative atmospheric moisture content of 53%.

The Table below clearly reveals the superiority of the films according to this invention, i.e., of the films produced as described in Examples 1, 2, and 3. It is true that a number of the properties tested are satisfactorily met by the comparative films, but none of the comparative films is capable of satisfying all demands.

The films produced in accordance with the state of the art have clearly reduced shrinkage values both in the longitudinal and in the transverse directions and therefore lead to the formation of creases and waves, particularly in the edge regions. Furthermore, the films of the state of the art exhibit higher haze and lower surface gloss values.

The multilayered films of the Comparative Examples also have a lower barrier action toward water vapor and oxygen.

Only the multilayered films according to Examples 1 to 3 simultaneously fulfill all requirements, and due to their tight, crease-free fitting to the goods to be wrapped, in combination with good optical properties, they result in wrapped packs possessing an attractive, brilliant appearance.

Due to the low permeability to water vapor and oxygen of the films according to this invention, the wrapped goods (foodstuffs, cigarettes) remain fresh over a prolonged period and their drying-out is considerably slowed down.

TABLE 1A

|  | Haze (4 plies) (%) | Gloss angle of measurement 20° | | Scratch resistance (%) | | Longitudinal shrinkage (120° C., 15 min) (%) | Transverse shrinkage (120° C., 15 min) (%) |
| --- | --- | --- | --- | --- | --- | --- | --- |
|  |  | 1st side | 2nd side | 1st side | 2nd side |  |  |
| Ex. 1 | ++ | ++ | ++ | ++ | ++ | 12.0 | 9.0 |
| Ex. 2 | ++ | ++ | ++ | ++ | ++ | 11.0 | 9.5 |
| Ex. 3 | ++ | ++ | ++ | ++ | ++ | 11.5 | 9.0 |
| C Ex. 1 | +− | +− | +− | ++ | ++ | 3.5 | 2.1 |

TABLE 1A-continued

|  | Haze (4 plies) (%) | Gloss angle of measurement 20° 1st side | Gloss angle of measurement 20° 2nd side | Scratch resistance (%) 1st side | Scratch resistance (%) 2nd side | Longitudinal shrinkage (120° C., 15 min) (%) | Transverse shrinkage (120° C., 15 min) (%) |
|---|---|---|---|---|---|---|---|
| C Ex. 2 | – | – | – | +– | +– | 2.5 | 1.7 |
| C Ex. 3 | – | – | – | +– | +– | 3.2 | 1.5 |

Ex. = Example
C Ex. = Comparative Example

TABLE 1B

| | Running properties on wrapping machine (visual assessment) | Appearance of wrapping (visual assessment) | Permeability to water vapor (g/cm² × d) | Permeability to oxygen (g/cm² × d) |
|---|---|---|---|---|
| Ex. 1 | ++ | tight, no creases | 0.79 | 1,040 |
| Ex. 2 | ++ | tight, no creases | 0.82 | 1,080 |
| Ex. 3 | ++ | tight, no creases | 0.68 | 840 |
| C Ex. 1 | + | loose, bulgy, wavy, edge regions creased | 1.50 | 1,650 |
| C Ex. 2 | +– | loose, bulgy, wavy, edge regions creased | 1.47 | 1,590 |
| C Ex. 3 | +– | loose, bulgy, wavy, edge regions creased | 1.53 | 1,710 |

Ex. = Example
C Ex. = Comparative Example

What is claimed is:

1. A transparent, coextruded multilayered polyolefin film which can be sealed on both sides, comprising a base layer comprised of a propylene polymer, and surface layers comprised of sealable olefin polymers, wherein:
   a) at 120° C., the multilayered film has a shrinkage in the longitudinal direction of more than about 7%, and a shrinkage in the transverse direction of more than about 5%;
   b) the base layer of the multilayered film comprises a peroxidically degraded propylene polymer, having a degradation factor in the range of from about 3 to 10, and a melting point in the range of from about 162° to 168° C.;
   c) the propylene polymer of the base layer is modified by addition of from about 5 to 25% by weight of a hydrocarbon resin;
   d) the surface layers of the multilayered film comprise a random ethylene/propylene copolymer having an ethylene content of from about 2 to 8% by weight, a distribution factor $V_F$ of more than about 8, and a thermooxidation temperature $T_{OX}$ of more than about 230° C.;
   e) the film having a surface gloss (measuring angle 20°) of more than about 100 measured in accordance with the procedures of DIN 67 530; and
   f) the film exhibiting a haze (measured on four superimposed film plies) of less than about 22% measured in accordance with the procedures of ASTM-D-1003-52.

2. A film as claimed in claim 1, wherein the surface of at least one sealing layer has been subjected to corona treatment, such that immediately after the treatment, it has a surface tension greater than about 36 mN/m.

3. A film as claimed in claim 1, wherein the hydrocarbon resin contained in the base layer has a softening point of more than about 120° C.

4. A film as claimed in claim 1, wherein at least one of the surface layers additionally contains an anti-blocking agent.

5. A film as claimed in claim 4, wherein the anti-blocking agent comprises an additive selected from one or more of the group consisting of silicon dioxide, calcium carbonate, magnesium silicate, a polyamide, a polyester and a benzoguanamine/formaldehyde copolymer.

6. A film as claimed in claim 4, wherein said anti-blocking agent has an average particle size of from about 1 to 6 μm and the added amount of anti-blocking agent is from about 0.1 to 2% by weight, relative to the total weight of the surface layer.

7. A film as claimed in claim 6, wherein the anti-blocking agent has an average particle size of from about 2 to 5 μm, and the added amount of anti-blocking agent is from about 0.1 to 0.5% by weight.

8. A film as claimed in claim 1, wherein the surface layer has a thickness of more than about 0.4 μm.

9. A film as claimed in claim 8, wherein the surface layer has a thickness between about 0.4 and 1.0 μm.

10. A film as claimed in claim 1, wherein the multilayered film has a total thickness of from about 10 to 60 μm, with each of the sealing layers having a thickness of more than about 0.4 μm, and the thickness of the base layer amounting to from about 50 to 90% of the total film thickness.

11. A film as claimed in claim 1, wherein the film has a shrinkage in the longitudinal direction of from about 8 to 15% and a shrinkage in the transverse direction of from about 6 to 12%, wherein the copolymer of the surface layers has an ethylene content of from about 3 to 7% by weight, and wherein the film exhibits a surface gloss between about 105 and 130 and a haze of between about 18 to 10%.

* * * * *